United States Patent
Inoue

(10) Patent No.: US 9,056,652 B2
(45) Date of Patent: Jun. 16, 2015

(54) BICYCLE PEDAL

(75) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 806 days.

(21) Appl. No.: 12/948,861

(22) Filed: Nov. 18, 2010

(65) Prior Publication Data

US 2012/0125148 A1    May 24, 2012

(51) Int. Cl.
 *B62M 3/08* (2006.01)

(52) U.S. Cl.
 CPC .............. *B62M 3/086* (2013.01); *Y10T 74/217* (2015.01)

(58) Field of Classification Search
 CPC .............................. B62M 3/086; Y10T 74/217
 USPC ............................................. 74/594.4, 594.6
 See application file for complete search history.

(56) References Cited

U.S. PATENT DOCUMENTS

| | | | | |
|---|---|---|---|---|
| 5,557,985 A * | 9/1996 | Nagano | | 74/594.6 |
| 5,771,757 A * | 6/1998 | Hanamura | | 74/594.4 |
| 6,014,914 A * | 1/2000 | Ueda | | 74/594.6 |
| 6,070,493 A * | 6/2000 | Chen | | 74/594.6 |
| 6,128,973 A * | 10/2000 | Nagano | | 74/594.6 |
| 6,164,158 A | 12/2000 | Landru et al. | | |
| 6,425,304 B1 * | 7/2002 | Bryne | | 74/594.6 |
| 6,446,529 B1 | 9/2002 | Tanaka | | |
| 6,845,688 B2 | 1/2005 | Muraoka | | |
| 8,516,923 B2 * | 8/2013 | Hillairet et al. | | 74/594.7 |
| 2010/0005924 A1 | 1/2010 | Servignat et al. | | |
| 2011/0005348 A1 * | 1/2011 | DeBast et al. | | 74/594.6 |
| 2012/0125147 A1 * | 5/2012 | Inoue | | 74/594.6 |
| 2013/0025404 A1 * | 1/2013 | Inoue | | 74/594.6 |

FOREIGN PATENT DOCUMENTS

| | | | | |
|---|---|---|---|---|
| EP | 0 953 502 A1 | 11/1999 | | |
| FR | 2 862 041 | * 5/2005 | | B62M 3/08 |
| FR | 2 862 041 A1 | 5/2005 | | |
| FR | 2 919 578 | * 2/2009 | | B62M 3/08 |
| FR | 2 931 791 | * 12/2009 | | B62M 3/08 |
| WO | WO-2008/129145 A1 | 10/2008 | | |

OTHER PUBLICATIONS

EPO Machine Translation of FR 2862041, Lacombe et al., May 2005.*
EPO Machine translation of FR2931791, De Bast, Apr. 6, 2010.*

* cited by examiner

*Primary Examiner* — Vinh Luong
(74) *Attorney, Agent, or Firm* — Global IP Counselors

(57) ABSTRACT

A bicycle pedal is provided with a pedal spindle, a pedal body, a first cleat engagement member and a positioning member. The pedal body is rotatably mounted on the pedal spindle. The cleat engagement member is movably mounted to the pedal body between a release position and an engagement position. The positioning member is movably coupled relative to the pedal body between a first position and a second position. The positioning member moves the first cleat engagement member to the release position while the positioning member is moving from the second position to the first position. The positioning member moves the first cleat engagement member to the engagement position while the positioning member is moving from the first position to the second position.

19 Claims, 11 Drawing Sheets

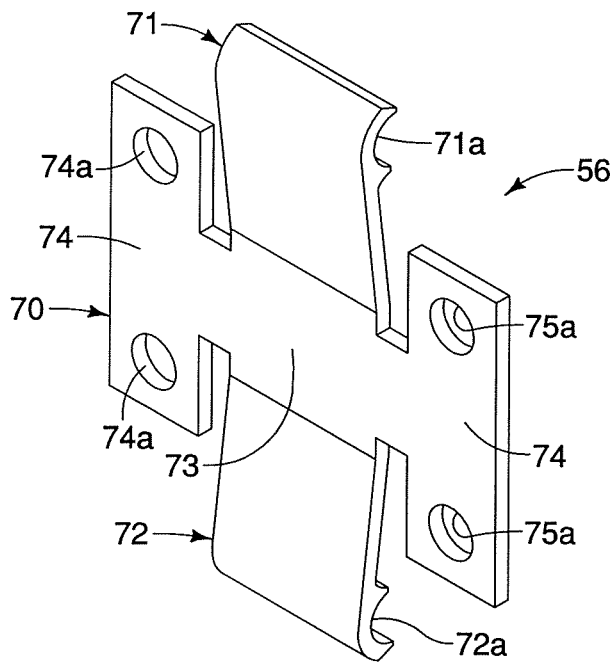
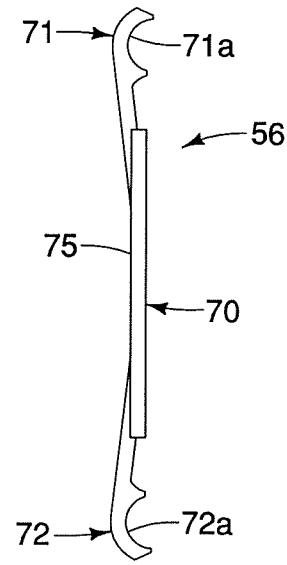
FIG. 16
FIG. 17
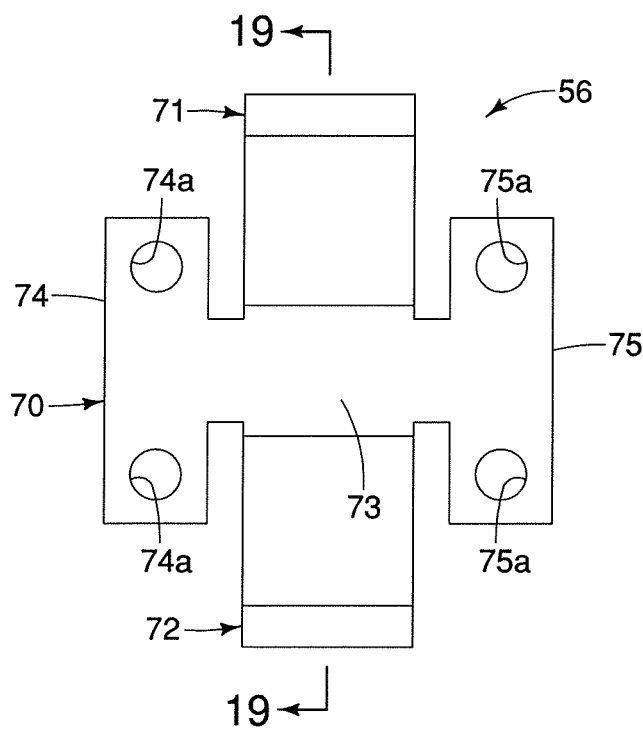
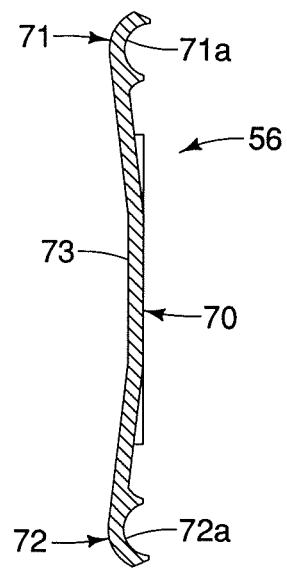
FIG. 18
FIG. 19

BICYCLE PEDAL

BACKGROUND

1. Field of the Invention

This invention generally relates to a bicycle pedal. More specifically, the present invention relates to a step-in or clipless type of bicycle pedal that engages a cleat in a releasable manner.

2. Background Information

Pedals are typically an essential bicycle component of most bicycles in that they transfer cycling power to the bicycle's drive train. Different styles of bicycles utilize different bicycle pedal styles that are designed for a specific purpose such as for pleasure, off road biking, road racing, etc. In recent years, step-in or clipless pedals have been gaining more popularity. The step-in or clipless pedal releasably engages a cleat that is secured to the sole of a rider's shoe. In other words, cleats are attached to the soles of specially-designed cycling shoes. The cleats lock the rider's feet into the pedals.

The step-in pedal typically has a pedal spindle that can be mounted on the crank of a bicycle, a pedal body that is rotatably supported on this pedal spindle, and at least one cleat engagement mechanism that clamps onto the cleat. In the case of off road bicycle pedals, typically both sides of the pedal body are provided with a cleat engagement mechanism for engaging a cleat in a releasable manner. On the other hand, in the case of road racing pedals, typically only one side of the pedal body is provided with a cleat engagement mechanism for engaging a cleat in a releasable manner. In either case, in using step-in or clipless types of bicycle pedals, the rider steps onto one side of the pedal body and the cleat engagement mechanism automatically grips on to the cleat that is secured to the bottom sole of the rider's shoe.

More specifically, in most cases, when attaching the rider's shoe to the step-in pedal via the cleat, the rider moves the shoe obliquely downwardly and forwardly relative to the pedal body such that the front end of the cleat engages a front hook or cleat engagement member of the pedal body. Once the front end of the cleat is engaged with the front hook of the pedal body, the rider places the rear end of the cleat in contact with a guide portion of the rear hook or cleat engagement member of the pedal body. In this position, the rider presses the shoe downwardly against the step-in pedal to cause the rear hook or cleat engagement member to initially pivot rearward against the force of a spring to move the rear hook or cleat engagement member to a cleat releasing position. The rear end of the cleat then enters a position opposite a back face of the rear hook or cleat engagement member. Then, the rear hook or cleat engagement member returns under the force of a biasing member or spring so that the rear hook or cleat engagement member engages the rear end of the cleat. This engagement fixes the rider's shoe to the step-in pedal via the cleat.

When releasing the shoe from most types of step-in pedals, the rider will typically turn the shoe about an axis perpendicular or approximately perpendicular to the tread of the rider's shoe, using the front end of the cleat as a pivoting point. As a result of this pivoting action, the rear cleat engagement member is pivoted rearward against the force of the spring to a cleat releasing position to release the shoe. Two examples of step-in pedals that operate in the above mentioned manner are disclosed in U.S. Pat. No. 6,845,688 and U.S. Pat. No. 6,446,529.

Of course, other types of step-in pedals have been proposed that operate in a slightly different manner. For example, U.S. Patent Publication No. 2010/0005924 discloses a step-in type of bicycle pedal in which the rear cleat engagement member is initially in a release position during a step-in operation. Also U.S. Pat. No. 6,164,158 discloses a step-in type of bicycle pedal in which a hydraulic circuit is used to move both front and rear cleat engagement members from initial released positions to engagement positions during a step-in operation.

SUMMARY

One object of the present invention is to provide a bicycle pedal that is easy to use.

The foregoing object can basically be attained by providing a bicycle pedal that basically comprises a pedal spindle, a pedal body, a first cleat engagement member and a positioning member. The pedal body is rotatably mounted on the pedal spindle. The cleat engagement member is movably mounted to the pedal body between a release position and an engagement position. The positioning member is movably coupled relative to the pedal body between a first position and a second position. The positioning member moves the first cleat engagement member to the release position while the positioning member is moving from the second position to the first position. The positioning member moves the first cleat engagement member to the engagement position while the positioning member is moving from the first position to the second position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 16 is an enlarged perspective view of one of the biasing member that selectively holds the control switch and the cleat engagement members in their cleat release position and their cleat engagement positions;

FIG. 17 is an edge elevational view of the biasing member shown in FIG. 16;

FIG. 18 is a side elevational view of the biasing member shown in FIGS. 16 and 17;

FIG. 19 is a cross sectional view of the biasing member shown in FIGS. 16 to 18 as seen along section line 19-19 of FIG. 18;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
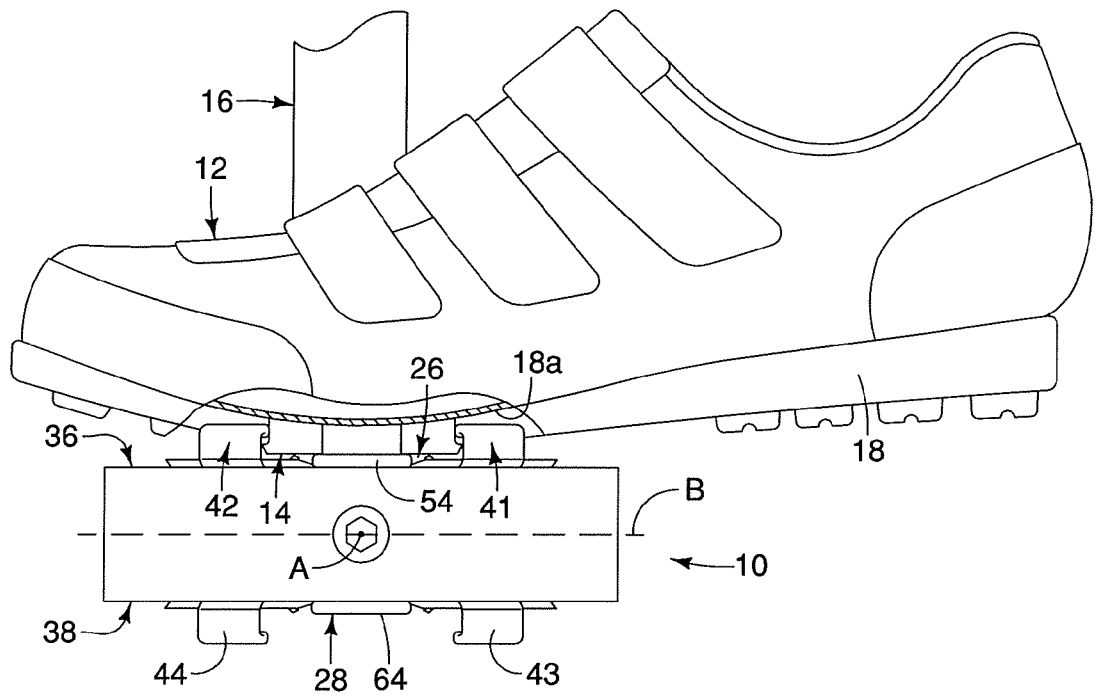
FIG. 1 is an outside elevational view of a bicycle shoe attached to a left bicycle pedal via a cleat of the bicycle shoe in accordance with one illustrated embodiment.
Figure 2:
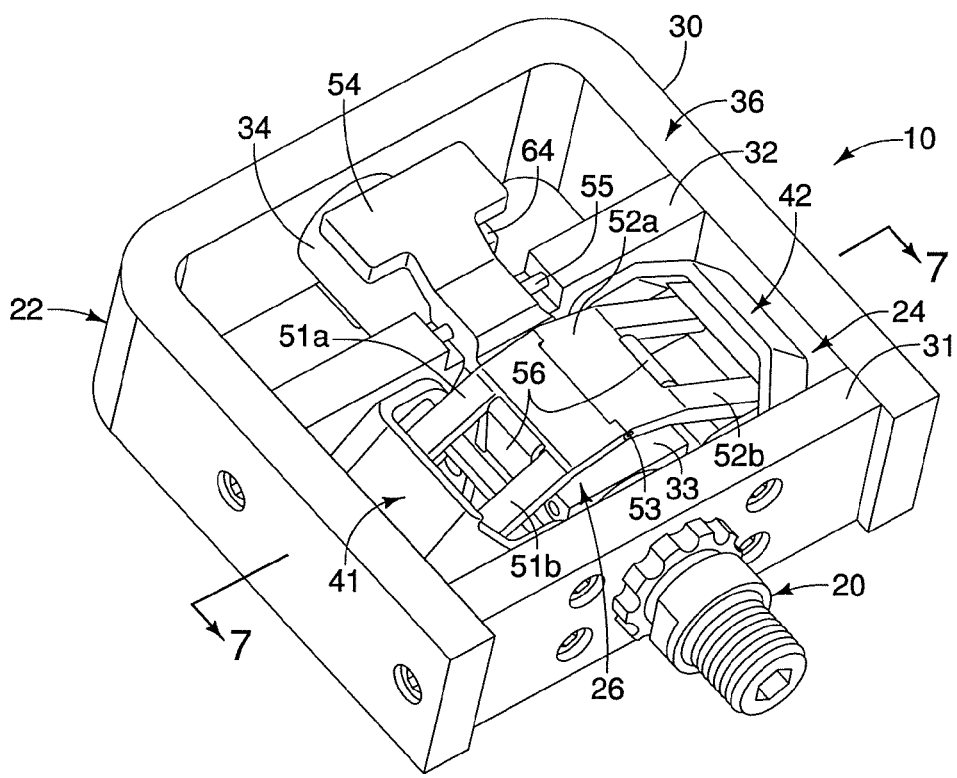
FIG. 2 is a top side perspective view of the bicycle pedal illustrated in FIG. 1, showing the control switch and the cleat engagement members in the cleat release positions.
Figure 3:
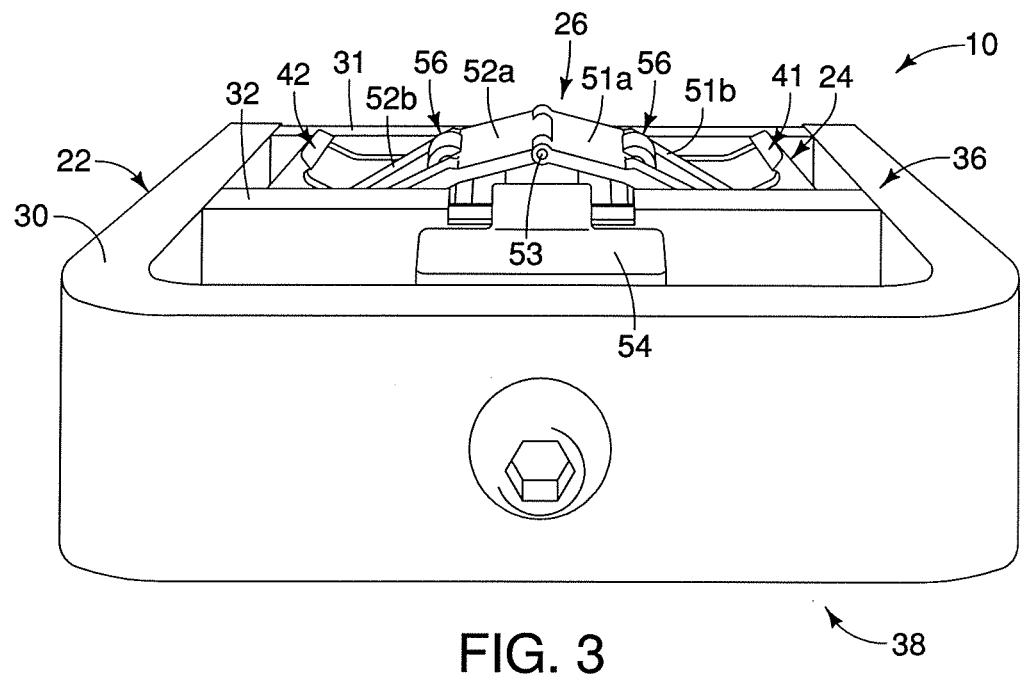
FIG. 3 is an outside perspective view of the bicycle pedal illustrated in FIGS. 1 and 2, showing the control switch and the cleat engagement members in the cleat release positions.
Figure 4:
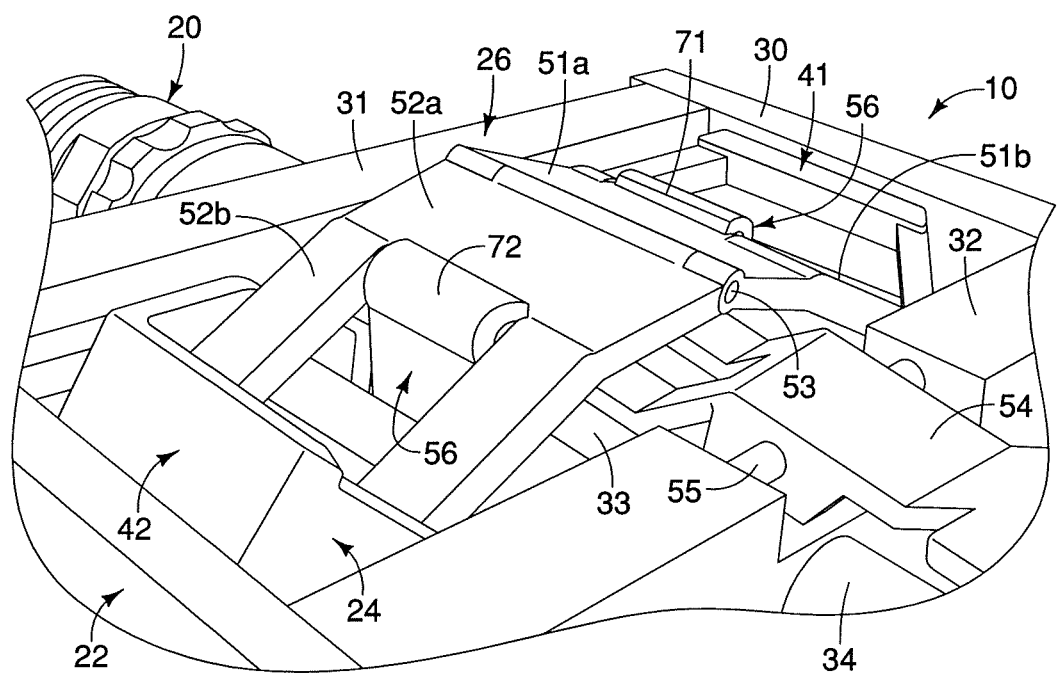
FIG. 4 is an enlarged perspective view of a portion of the bicycle pedal illustrated in FIGS. 1 to 3, showing the control switch and the cleat engagement members in the cleat release positions.

Referring initially to FIGS. 1 to 3, a bicycle pedal 10 is illustrated in accordance with a first illustrated embodiment. The bicycle pedal 10 is a clipless or step-in pedal that can be used with a bicycle shoe 12 having a cleat 14 coupled thereto. As seen in FIG. 1, the bicycle pedal 10 is fixedly coupled to a bicycle crank arm 16 of a bicycle in a conventional manner. The cleat 14 is fixedly coupled to a bottom surface of a sole 18 of the shoe 12 by a conventional fastening arrangement (not shown). The fastening arrangement typically includes a cleat nut plate, a cleat fixing plate and a pair of fixing bolts. However, the cleat fastening arrangement for the cleat 14 can be any type of fastening arrangement, and thus, the cleat fastening arrangement will not be discussed in detail herein.

As seen in FIG. 1, the cleat 14 is at least partially disposed in a recess 18a of the sole 18 of the shoe 12. The bicycle pedal 10 is configured and arranged such that the cleat 14 is engaged with the pedal 10 with a relatively low engagement force and such that the cleat 14 is disengaged from the pedal 10 with a relatively low disengagement force. As explained below, the cleat 14 is released from the bicycle pedal 10 by the rider tilting the shoe 12 away from the crank arm 16.

The bicycle pedal 10 mainly includes a pedal spindle or axle 20 and a pedal body 22. In FIGS. 1 to 6, the bicycle pedal 10 is a left side bicycle pedal. A right side bicycle pedal (not shown) is a mirror image of the left side bicycle pedal 10, except that the pedal spindle of the right-side (usually the drive-side) has a right-hand thread, while the pedal spindle 20 of the left-side (usually the non-drive-side) has a left-hand (reverse) thread to help prevent the pedals from becoming loose. Accordingly, for the sake of simplicity, only the bicycle pedal 10, which is a left side bicycle pedal, will be illustrated and described herein. Of course, the description of the bicycle pedal 10 applies to a right-side bicycle pedal.

The pedal spindle 20 is a rigid member that is made of a suitable lightweight material, such as aluminum alloy. The pedal spindle 20 is a relatively conventional part of the bicycle pedal 10, and thus, the pedal spindle 20 will not be discussed in more detail. Basically, the pedal spindle 20 has a first end with a thread that is adapted to be threaded into a hole of the crank arm 16, and a second end that rotatably supports the pedal body 22 such that the pedal body 22 rotates relative to the crank arm 16. The pedal spindle 20 has a center spindle axis A. The pedal body 22 is rotatably mounted on the pedal spindle 20 about the center spindle axis A.

In this embodiment, the bicycle pedal 10 also includes a pair of cleat retaining structures 24 for selectively securing the cleat 14 to the pedal body 22. Depending on the orientation of the pedal body 22, one of the ends of the pedal body 22 is considered a front or first end, while the other end is considered a second or rear end. Also in this embodiment, the bicycle pedal 10 includes a first control switch 26 and a second control switch 28. The first and second control switches 26 and 28 are used for controlling engagement and release of the cleat 14 to the pedal body 22 as discussed below.

The first control switch 26 constitutes a first step-in actuator, while the second control switch 28 constitutes a second step-in actuator.

Referring to FIG. 2, the pedal body 22 is a rigid member that is made of a suitable lightweight material, such as aluminum alloy, a synthetic resin, or a fiber reinforced plastic. The pedal body 22 is designed to support a rider's foot by a releasable connection between the cleat retaining structure 24 and the cleat 14. In the illustrated embodiment, the pedal body 22 includes a U shaped cage member 30, a first cross member 31, a second cross member 32, a first tubular spindle supporting member 33 and a second tubular spindle supporting member 34. Of course, other configurations of the pedal body 22 are possible. In the illustrated embodiment, the members 30 to 34 of the pedal body 22 are rigidly fixed together by suitable fasteners to form an integrated unit.

Figure 5:
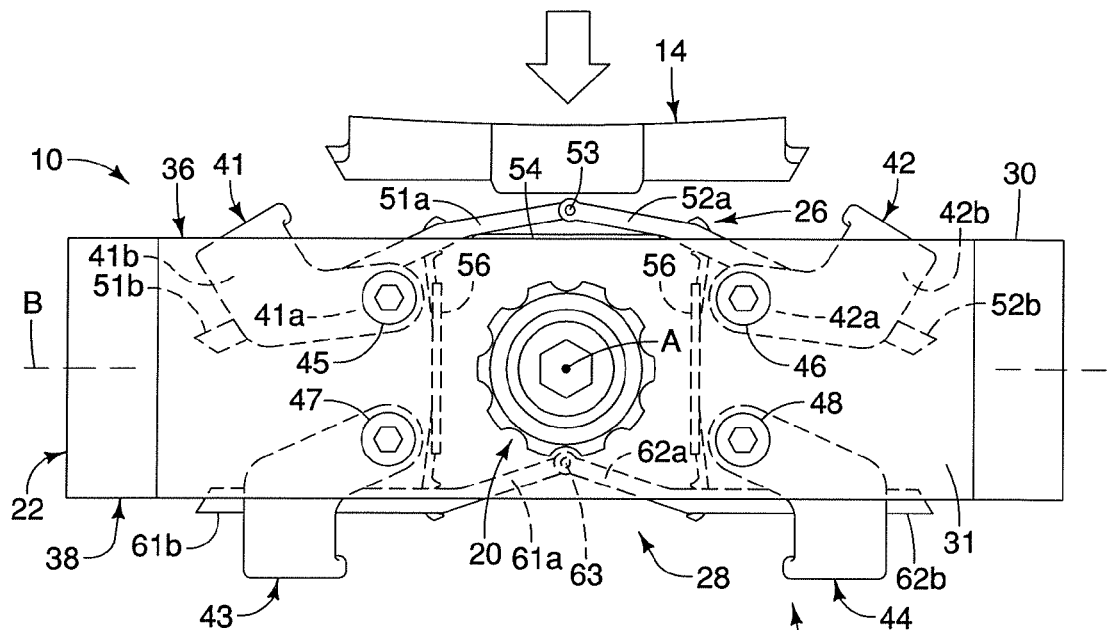
FIG. 5 is an inside elevational view of the bicycle pedal illustrated in FIGS. 1 to 4, with the cleat being moved towards the bicycle pedal and located just prior to engagement with the cleat engagement members of the bicycle pedal.
Figure 6:
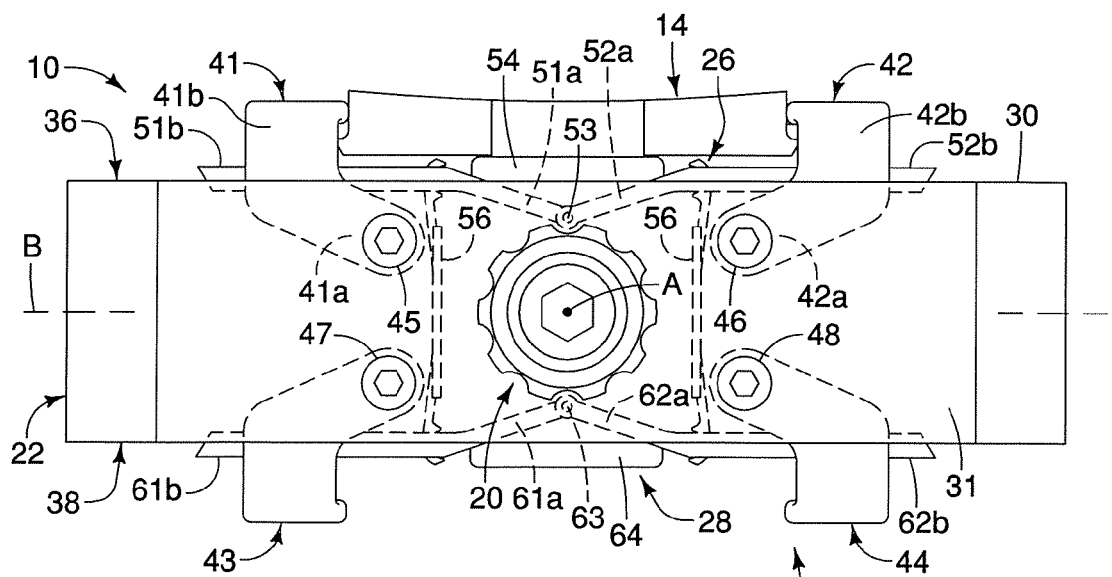
FIG. 6 is an inside elevational view of the bicycle pedal illustrated in FIGS. 1 to 5, with the cleat engaged with the cleat engagement members of the bicycle pedal to releasable secure the cleat to the bicycle pedal.

The first and second tubular spindle supporting members 33 and 34 have axially aligned bores that rotatably receives a portion of the pedal spindle 20 therein for rotation via bearings about the center spindle axis A. Depending on the orientation of the pedal body 22, one of the ends of the pedal body 22 is considered a front or first end, while the other end is considered a second or rear end. As seen in FIGS. 5 and 6, the pedal body 22 has a center plane B extending through the center spindle axis A. The center plane B divides the pedal body 22 into first and second shoe supporting sides 36 and 38. The center plane B bisects the pedal body 22 with a cleat receiving area formed on each side of the first and second shoe supporting sides 36 and 38. The first and second shoe supporting sides 36 and 38 can also be considered first and second cleat engagement sides. The center plane B constitutes a reference plane lying between the first and second shoe supporting sides 36 and 38 and passing through the center spindle axis A. Also as used herein, the longitudinal direction of the pedal body 22 is defined as a direction that is perpendicular to the center spindle axis A and extends parallel to the center plane B.

As seen in FIGS. 5 and 6, the cleat retaining structure 24 includes a pair of cleat engagement members 41 and 42 disposed on the first shoe supporting side 36 of the pedal body 22 with respect to the center plane B. The cleat retaining structure 24 further includes a pair of cleat engagement members 43 and 44 disposed on the second shoe supporting side 38 of the pedal body 22 with respect to the center plane B. The cleat engagement members 41 and 42 are each movably mounted relative to the pedal body 22 between a cleat release position and a cleat engagement position. Thus, the cleat 14 can be selectively retained on the first and second shoe supporting sides 36 and 38 of the pedal body 22. While the illustrated embodiment uses two movable cleat engagement members on each the sides 36 and 38 of the pedal body 22, it will be apparent from this disclosure that one of the cleat engagement members on each the sides 36 and 38 of the pedal body 22 can be a fixed cleat engagement member as needed and/or desired. Also while the illustrated embodiment uses a cleat retaining structure on each the sides 36 and 38 of the pedal body 22, it will be apparent from this disclosure that the pedal can have only one cleat retaining structure 24 on the pedal body 22 as needed and/or desired.

In the illustrated embodiment, the cleat engagement members 41 and 42 are pivotally attached to the pedal body 22 by a pair of first pivot pins 45 and 46, respectively. The cleat engagement members 41 and 42 selectively engage the cleat 14 to retain the cleat 14 to the first shoe supporting side 36 of the pedal body 22 in response to the first control switch 26 being actuated by the rider stepping on the first control switch 26 with the cleat 14. In the illustrated embodiment, the cleat engagement members 41 and 42 move together in response to the first control switch 26 being actuated by the rider stepping on the first control switch 26 with the cleat 14. Similar to the cleat engagement members 41 and 42, the cleat engagement members 43 and 44 are each movably mounted relative to the pedal body 22 between a release position and an engagement position. The cleat engagement members 43 and 44 are pivotally attached to the pedal body 22 by a pair of second pivot pins 47 and 48. The pedal body 22 has a stop pin 49 (only two shown) associated with each of the cleat engagement members 41, 42, 43 and 44 for limiting the movement of the cleat engagement members 43 and 44 relative to the pedal body 22. The stop pins 49 define the cleat release positions of the cleat engagement members 41, 42, 43 and 44.

For controlling the positions of the cleat engagement members 41 and 42, the first control switch 26 is arranged to move to the cleat engagement members 41 and 42 between the cleat release position and the cleat engagement position. As seen FIGS. 7 to 9, in this illustrated embodiment, the first control switch 26 includes a first bridge member 51a for controlling the movement of the cleat engagement member 41 and a second bridge member 52a for controlling the movement of the cleat engagement member 42. A first positioning member 51b is coupled to the first bridge member 51a, while a second positioning member 52b is coupled to the second bridge member 52a. In the illustrated embodiment, the first positioning member 51b is formed as a one-piece, unitary part of the first bridge member 51a, and the second positioning member 52b is formed as a one-piece, unitary part of the second bridge member 52a. Alternatively, the first and second positioning members 51b and 52b can be separate parts from the first and second bridge members 51a and 52a. Also a separate intermediate part can be interposed between each of the first and second positioning members 51b and 52b and the first and second bridge members 51a and 52a as needed and/or desired.

The cleat engagement members 43 and 44 selectively engage the cleat 14 to retain the cleat 14 to the second shoe supporting side 38 of the pedal body 22 in response to the second control switch 28 being actuated by the rider stepping on the second control switch 28 with the cleat 14. The second control switch 28 includes a first bridge member 61a and a second bridge member 61b that are pivotally coupled together at their first ends by a pivot pin 63. The second ends of the first and second bridge members 61a and 61b have first and second positioning members 61b and 62b, respectively. The cleat engagement members 43 and 44 are identical in construction to the cleat engagement members 41 and 42. Also the second control switch 28 is identical in construction to the first control switch 26. Thus, the operation of the cleat engagement members 43 and 44 by the second control switch 28 is the same as the operation of the cleat engagement members 41 and 42 by the first control switch 26. In other words, in the illustrated embodiment, the cleat engagement members 43 and 44 move together in response to the first and second bridge members 61a and 61b of the second control switch 28 being actuated by the rider stepping on the second control switch 28 with the cleat 14. In view of the similarities between the first control switch 26 and the second control switch 28, the construction and operation of the cleat engagement members 43 and 44 by the second control switch 28 will not be discussed herein for the sake of brevity. Rather only the operation of the control switch 26 will be discussed herein for the sake of brevity.

Generally, the control switch 26 is movably coupled relative to the pedal body 22 to switch a push direction applied to the first and second positioning members 51b and 52b with respect to the cleat engagement members 41 and 42 from a first pushing direction to a second pushing direction that is different from the first pushing direction. In the illustrated embodiment, the first pushing direction is towards the center plane B of the pedal body 22, while the second pushing direction is away from the center plane B of the pedal body 22. More specifically, the first and second pushing directions are perpendicular to the center plane B of the pedal body 22.

The first and second bridge members 51a and 52a have first ends movably connected together, while the first and second bridge members 51a and 52a have second ends coupled to the first and second positioning members 51b and 52b, respectively. In this illustrated embodiment, the first ends of the first and second bridge members 51a and 52a are pivotally coupled together by a pivot pin 53, and the second ends of the first and second bridge members 51a and 52a are rigidly coupled to the first and second positioning members 51b and 52b. Also in this embodiment, the first and second positioning members 51b and 52b are each formed as two rigid flanges that selectively contact the cleat engagement members 41 and 42, respectively. Thus, the first and second positioning members 51b and 52b are each movably coupled relative to the pedal body 22 between a first position (FIG. 5) that corresponds to the cleat release position and a second position (FIG. 6) that corresponds to the cleat engagement position.

As best can be determined by FIG. 2, the cleat engagement members 41 and 42 are generally inverted U-shaped members with respect to the first pivot pins 45 and 46, respectively. The cleat engagement member 41 has an attachment end 41a and an engagement end 41b. Likewise, the cleat engagement member 42 has an attachment end 42a and an engagement end 42b. The attachment ends 41a and 42a are pivotally attached to the first pivot pins 45 and 46, respectively, as seen in FIGS. 5 and 6. The engagement ends 41b and 42b are longitudinally spaced from the axes of the first pivot pins 45 and 46, respectively, with respect to the longitudinal direction of the pedal body 22. Thus, the attachment ends 41a and 42a are disposed closer to the pedal spindle 20 than the engagement ends 41b and 42b, respectively. With this arrangement, the cleat engagement members 41 and 42 have their center of gravities longitudinally spaced from the first pivot pins 45 and 46, respectively, with respect to the longitudinal direction of the pedal body 22. With this configuration of the cleat engagement members 41 and 42, when the pedal 10 is positioned with the center plane B being parallel to the horizon (i.e., level), the cleat engagement members 41 and 42 are able to move to their release positions, respectively, without being pushed by the first and second positioning members 51b and 52b towards their release positions. In other words, during a normal step-in operation, the first and second positioning members 51b and 52b will typically be moved by the cleat 14 such that the first and second positioning members 51b and 52b push the cleat engagement members 41 and 42 to their release positions, respectively. However, even without pushing by the first and second positioning members 51b and 52b, the cleat engagement members 41 and 42 can move towards their release positions by gravity. Thus, the cleat engagement members 41 and 42 are effectively biased by gravity from their cleat engagement positions towards their release positions under their own weight when the pedal 10 is positioned with the center plane B being parallel to the horizon (i.e., level) and no pushing force is applied by the first and second positioning members 51b and 52b.

More specifically, the cleat engagement member 41 has two contact surfaces 41c and 41d, which are selectively engaged by the first positioning member 51b for selectively moving the cleat engagement member 41 between the cleat release position and the cleat engagement position. The first positioning member 51b contacts the contact surface 41c and moves the first cleat engagement member 41 to the cleat release position while the first positioning member 51b is moving from the second position to the first position. Also the first positioning member 51b contacts the contact surface 41d and moves the first cleat engagement member 41 to the cleat engagement position while the first positioning member 51b is moving from the first position to the second position. In this embodiment of FIGS. 1 to 19, the first positioning member 51b is configured and arranged with respect to the contact surface 41c such that the first positioning member 51b remains in contact with the contact surface 41c while the first positioning member 51b is in the first position (FIG. 5). Also in this embodiment of FIGS. 1 to 19, the first positioning member 51b is configured and arranged with respect to the contact surface 41c such that the first positioning member 51b remains in contact with the contact surface 41c while the first positioning member 51b is in the second position (FIG. 6).

Likewise, the cleat engagement member 42 has two contact surfaces 42c and 42d, which are selectively engaged by the second positioning member 52b for selectively moving the cleat engagement member 42 between the cleat release position and the cleat engagement position. The second positioning member 52b contacts the contact surface 42c and moves the second cleat engagement member 42 to the cleat release position while the second positioning member 52b is moving from the second position to the first position. Also the second positioning member 52b contacts the contact surface 42d and moves the second cleat engagement member 42 to the cleat engagement position while the second positioning member 52b is moving from the first position to the second position. In this embodiment of FIGS. 1 to 19, the second positioning member 52b is configured and arranged with respect to the contact surface 42c such that the second positioning member 52b remains in contact with the contact surface 42c while the second positioning member 52b is in the first position (FIG. 5). Also in this embodiment of FIGS. 1 to 19, the second positioning member 52b is configured and arranged with respect to the contact surface 42c such that the second positioning member 52b remains in contact with the contact surface 42c while the second positioning member 52b is in the second position (FIG. 6).

Thus, the contact surface 41c of the first positioning member 51b and the contact surface 42c of the second positioning member 52b are configured with respect to the first and second cleat engagement members 41 and 42 such that the first and second positioning members 51b and 52b prevent movement the first and second cleat engagement members 41 and 42 from their cleat engagement positions to the cleat release positions while first and second positioning members 51b and 52b are in the first position. Also the contact surface 41d of the first positioning member 51b and the contact surface 42d of the second positioning member 52b are configured with respect to the first and second cleat engagement members 41 and 42 such that the first and second positioning members 51b and 52b prevent movement of the first and second cleat engagement members 41 and 42 from their cleat engagement positions to the cleat release positions while first and second positioning members 51b and 52b are in their second positions.

Figure 7:
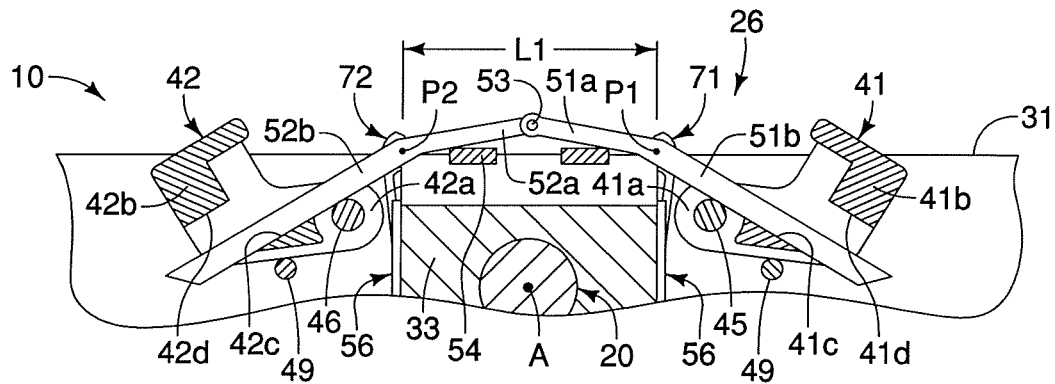
FIG. 7 is an enlarged longitudinal cross sectional view of a portion of the bicycle pedal illustrated in FIGS. 1 to 6, with the cleat engaged with the cleat engagement members of the bicycle pedal in the cleat release positions.

The first control switch 26 further includes a disengagement member or lever 54 that is pivotally mounted to the pedal body 22 by a pivot pin 55. The disengagement member 54 moves the first and second positioning members 51b and 52b from their second positions that correspond to the cleat engagement positions (FIG. 9) to their first positions that correspond to the cleat release positions (FIG. 7). During a cleat disengagement operation, rider pushes down on the disengagement member 54 which causes the disengagement member 54 to pivot on the pivot pin 55. This pivotal movement of the disengagement member 54 moves the first ends of the first and second bridge members 51a and 52a away from the pedal body 22 and moves the first and second positioning members 51b and 52b towards the center plane B of the pedal body 22.

The second control switch 28 also includes a disengagement member or lever 64 that is pivotally mounted to the pedal body 22 by a pivot pin 65. The disengagement member 64 moves the first ends of the first and second bridge members 61a and 62a away from the pedal body 22 against urging forces of the biasing members 56 in response to operation of the disengagement member 64. The disengagement member 64 is identical to the disengagement member 54. Thus, the description of the disengagement member 54 also applies to the disengagement member 64.

Figure 10:
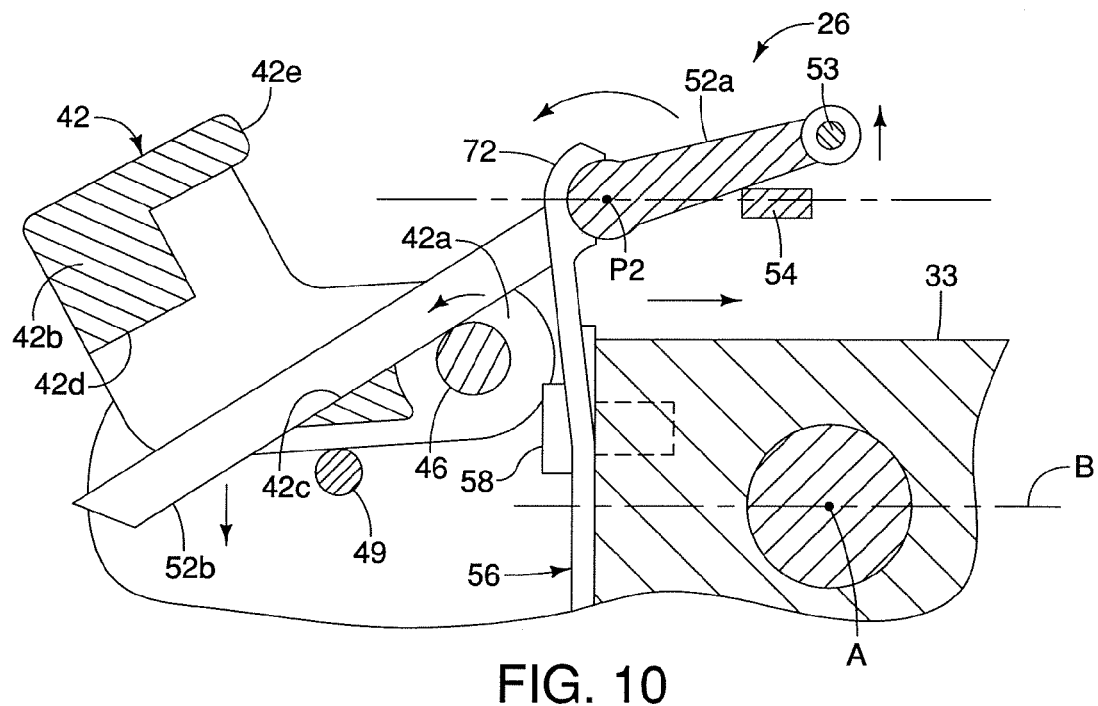
FIG. 10 is a further enlarged cross sectional view of a portion of the bicycle pedal illustrated in FIGS. 1 to 6, showing the control switch and the cleat engagement member in the cleat release positions.
Figure 11:
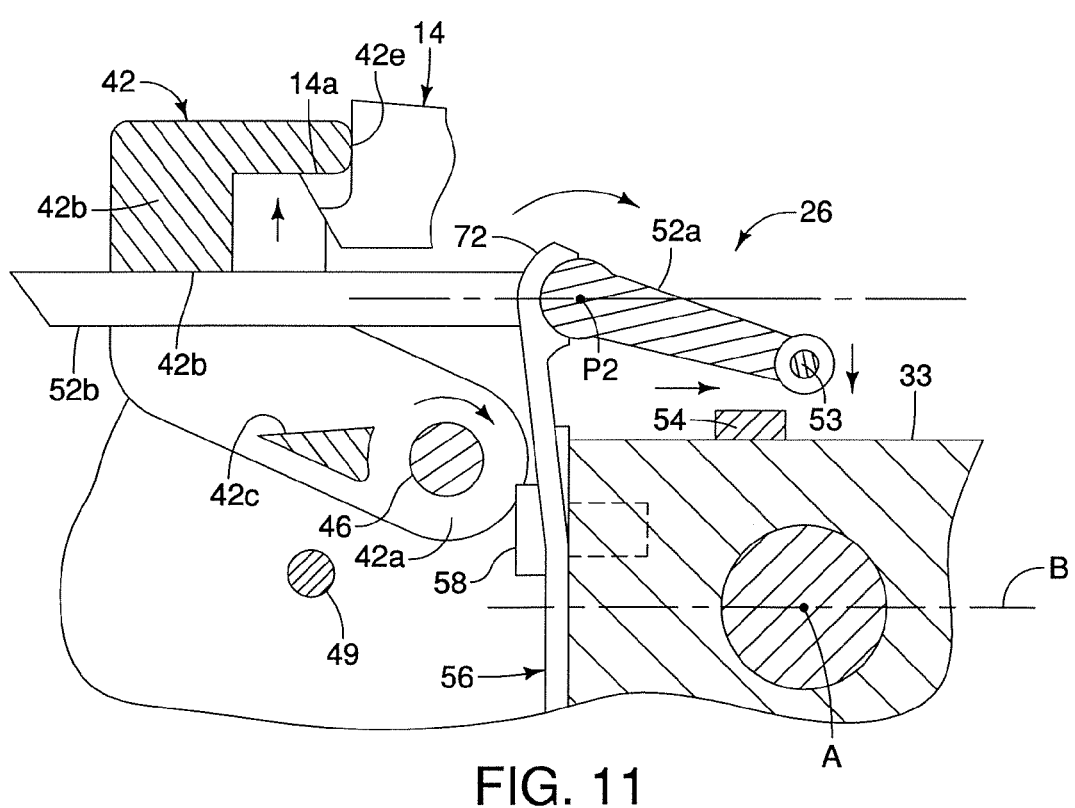
FIG. 11 is a further enlarged cross sectional view of a portion of the bicycle pedal illustrated in FIGS. 1 to 6, showing the control switch and the cleat engagement member in the cleat engagement positions.
Figure 12:
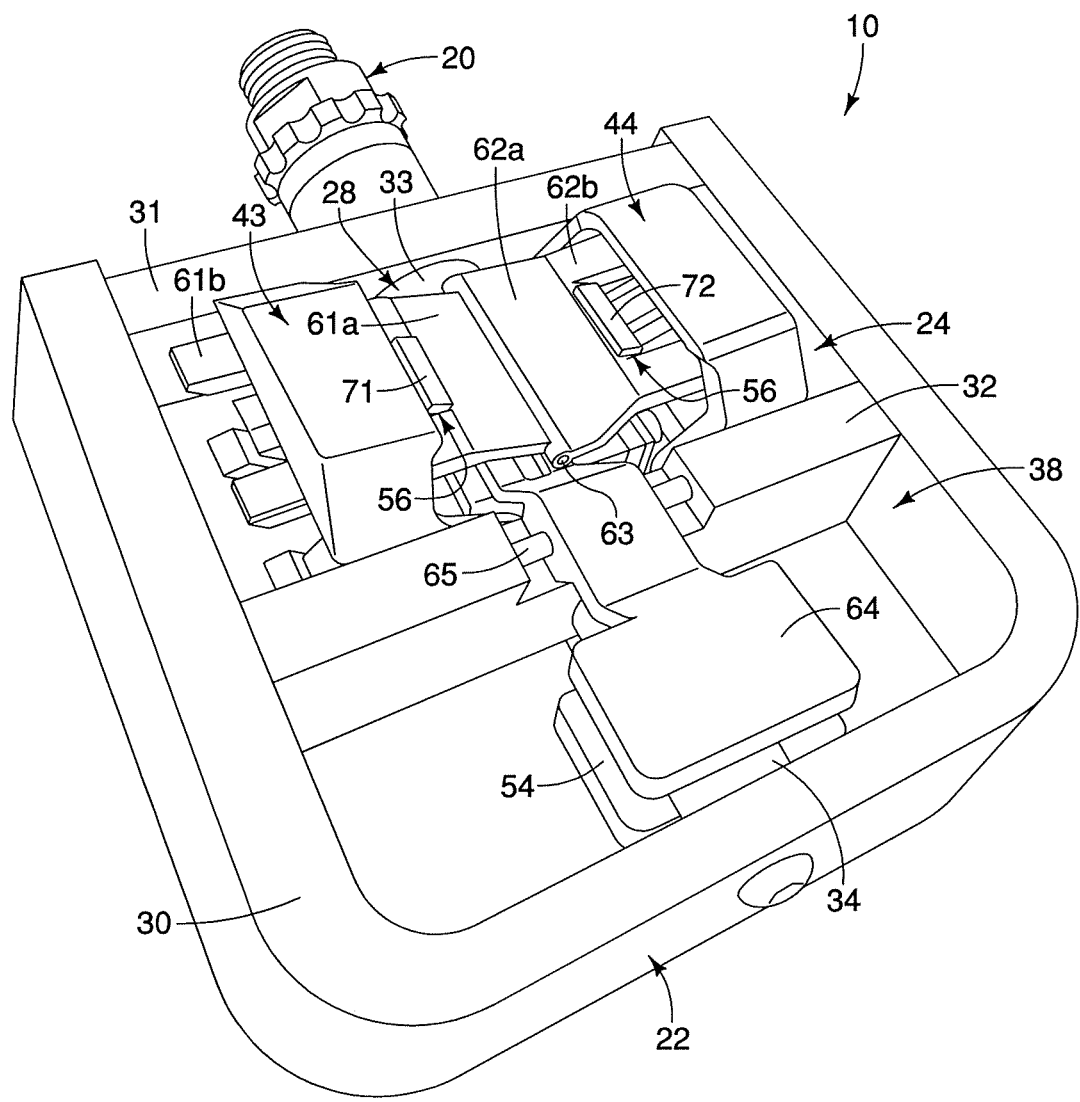
FIG. 12 is a top side perspective view of the bicycle pedal illustrated in FIG. 1, showing the control switch and the cleat engagement members in the cleat engagement positions.
Figure 13:
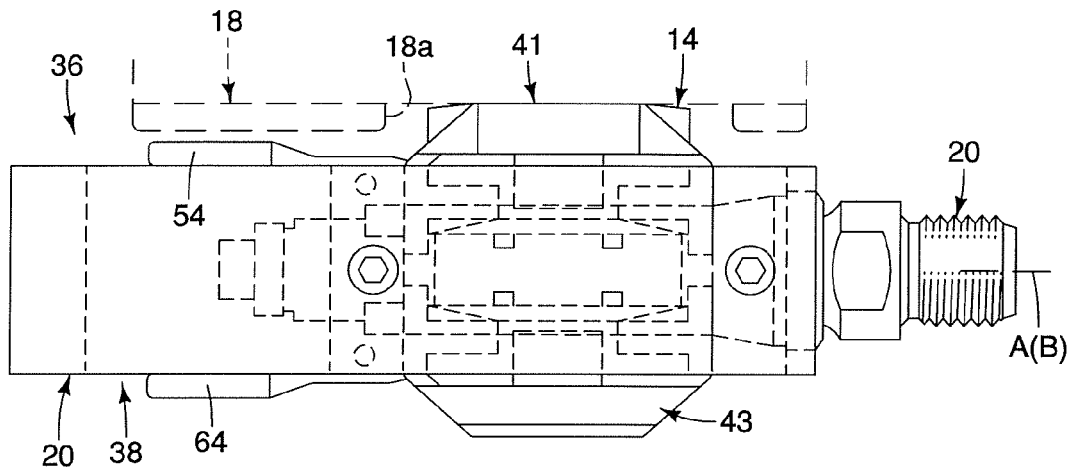
FIG. 13 is a rear elevational view of the bicycle pedal illustrated in FIG. 1, showing the control switch and the cleat engagement members in the cleat engagement positions with the cleat fully engaged with the cleat engagement members.
Figure 14:
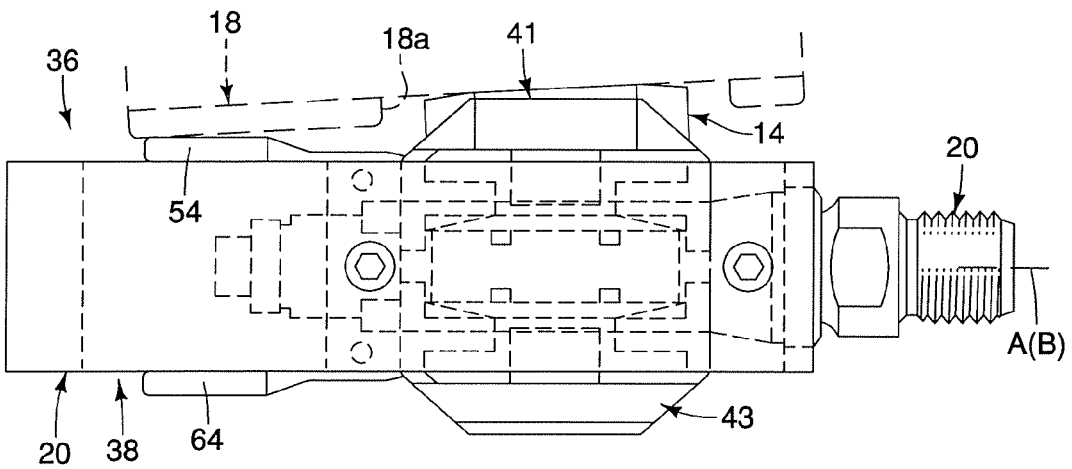
FIG. 14 is a rear elevational view of the bicycle pedal illustrated in FIG. 1, showing the sole of the bicycle shoe in phantom lines with the sole of the bicycle shoe being tilted to engage the disengagement lever of the control switch to release the cleat from the cleat engagement members.
Figure 15:
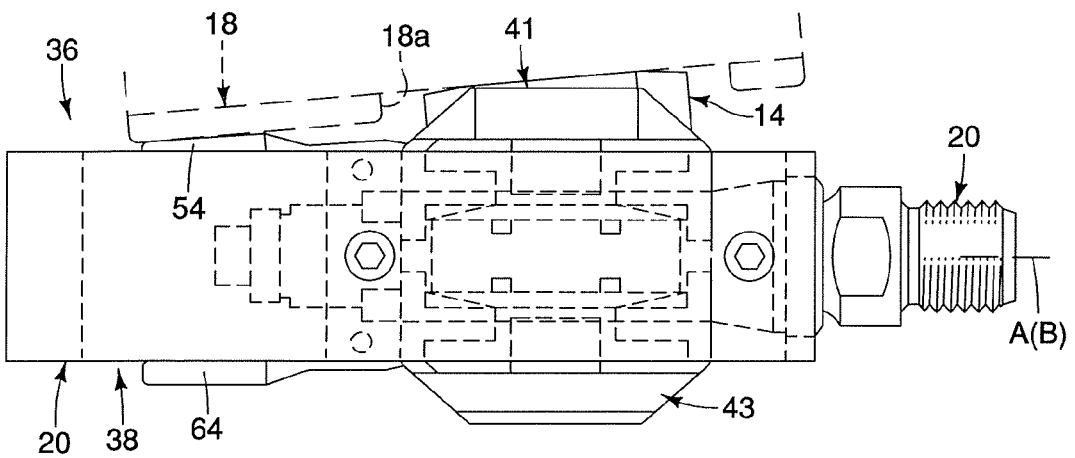
FIG. 15 is a rear elevational view of the bicycle pedal illustrated in FIG. 1, showing the sole of the bicycle shoe in phantom lines with the sole of the bicycle shoe being tilted to engage the disengagement lever of the control switch to release the cleat from the cleat engagement members.

Also in this illustrated embodiment, the first control switch 26 further includes two biasing members 56 that are each fixed to the pedal body 22 by four screws 58 (only one shown in FIGS. 10 and 11). The biasing members 56 also form part of the second control switch 28, as discussed below. In this illustrated embodiment, the biasing members 56 are leaf springs that selectively hold the first and second bridge members 51a and 52a in a step-in or actuation ready position and a holding or non-actuation ready position of the first control switch 26. Basically, the biasing members 56 bias the first and second bridge members 51a and 52a towards each other. In other words, the biasing member 56 contacts the first and second bridge members 51a and 52a such that the biasing member 56 biases the first and second bridge members 51a and 52a inwardly towards each other. The bias direction of the biasing members 56 does not change as the first and second bridge members 51a and 52a moved between the actuation ready position and the non-actuation ready position. In this way, the biasing members 56 contact the first and second bridge members 51a and 52a such that the biasing members 56 bias the first and second bridge members 51a and 52a inwardly towards each other as the first and second positioning members 51b and 52b move between their cleat release positions and their cleat engagement positions.

When the first and second bridge members 51a and 52a of the first control switch 26 are disposed in the step-in or actuation ready position, the first and second bridge members 51a and 52a of the first control switch 26 transmits a first biasing force from the biasing members 56 to the cleat engagement members 41 and 42. This first biasing force biases the cleat engagement members 41 and 42 to their cleat release positions via the first and second positioning members 51b and 52b. The biasing members 56 contact the first and second bridge members 51a and 52a such that the biasing members 56 selectively hold the first and second bridge members 51a and 52a in a convex arrangement so as to bulge outwardly with respect to the pedal body 22 when in the step-in or actuation ready position. However, when the first and second bridge members 51a and 52a of the first control switch 26 are disposed in the holding or non-actuation ready position, the first and second bridge members 51a and 52a of the first control switch 26 transmits a second biasing force from the biasing members 56 to the cleat engagement members 41 and 42. This second biasing force biases the cleat engagement members 41 and 42 to their cleat engagement positions via the first and second positioning members 51b and 52b. When in the non-actuation ready position, the biasing members 56 contact the first and second bridge members 51a and 52a such that the biasing members 56 selectively hold the first and second bridge members 51a and 52a in a concave arrangement so as to protrude inwardly with respect to the pedal body 22.

Referring now mainly to FIGS. 16 to 19, each of the biasing members 56 basically includes a mounting portion 70, a first stop 71 and a second stop 72. The mounting portions 70 of the biasing members 56 are fixedly secured to the pedal body 22 by the screws 58 (only one shown in FIGS. 10 and 11). In particular, the mounting portion 70 includes a center part 73 and a pair of mounting tabs 74 and 75. The mounting tab 74 has two holes 74a for receiving two of the screws 58 that are threaded into bores of the pedal body 22. Likewise, the mounting tab 75 has two holes 75a for receiving two of the screws 58 that are threaded into bores of the pedal body 22. The first stop 71 has a first curved engagement surface 71a that pivotally supports the second end of the first bridge member 51a about a pivot axis P1 as seen in FIGS. 6 to 9. The second stop 72 has a second curved engagement surface 72a that pivotally supports the second end of the second bridge member 52a about a pivot axis P2 as seen in FIGS. 6 to 9. These pivot axes P1 and P2 are not stationary axes with respect to the pedal body 22, but rather these pivot axes P1 and P2 shift with respect to the pedal body 22 as the first and second bridge members 51a and 52a moves between the step-in or actuation ready position and the holding or non-actuation position. The first and second stops 71 and 72 hold the first and second bridge members 51a and 52a from moving until a force is applied to the first and second bridge members 51a and 52a that overrides urging forces of the biasing members 56. The urging forces of the biasing members 56 on the first and second bridge members 51a and 52a are typically overridden by either the rider stepping on the first and second bridge members 51a and 52a or the disengagement member 54 pushing the first and second bridge members 51a and 52a.

In conjunction with the biasing members 56, the first and second positioning member 51b and 52b are configured with respect to the first and second cleat engagement members 41 and 42 such that a pushing force applied to the first and second cleat engagement members 41 and 42 towards the cleat engagement positions increases until the first and second cleat engagement members 41 and 42 arrive at a middle position between their cleat engagement positions and their cleat release positions from their cleat engagement positions. Likewise, in conjunction with the biasing members 56, the first and second positioning members 51b and 52b are configured with respect to the first and second cleat engagement members 41 and 42 such that a pushing force applied to the first and second cleat engagement members 41 and 42 towards their cleat release positions increases until the first and second cleat engagement members 41 and 42 arrive at a middle position between their cleat engagement positions and their cleat release positions from their cleat release positions.

Generally, the first ends of first and second bridge members 51a and 52a are above this middle position, the first ends of first and second bridge members 51a and 52a are biased upward by the biasing members 56. Therefore the cleat engagement members 41 and 42 are disposed in their cleat release position. When the first ends of first and second bridge members 51a and 52a are below this middle position, the center portion is biased downward by the biasing members 56. Therefore the cleat engagement members 41 and 42 are disposed in their cleat engagement positions. When the cleat engagement members 41 and 42 are disposed in their cleat release position and the first and second bridge members 51a and 52a are pushed down by the cleat (shown FIG. 9), the cleat engagement members 41 and 42 are moved to their cleat engagement positions and engage the cleat 14 by the first and second positioning members 51b and 52b as explained below.

In the step-in or actuation ready position, the first control switch 26 is ready for the rider to step on the first and second bridge members 51a and 52a to move the cleat engagement members 41 and 42 from their cleat release position to their cleat engagement positions. Normally, as best seen in FIG. 5, when the cleat 14 is not engaged with the cleat engagement members 41 and 42, the first control switch 26 is disposed in the actuation ready position so that the cleat engagement members 41 and 42 are held in their cleat release position. In the actuation ready position, the first ends of the first and second bridge members 51a and 52a are bowed outwardly from the pedal body 22. Also in the actuation ready position, the second ends of the first and second bridge members 51a and 52a are contacting the contact surfaces 41c and 42c of the cleat engagement members 41 and 42, respectively. This contact between the second ends of the first and second bridge members 51a and 52a and the contact surfaces 41c and 42c of the cleat engagement members 41 and 42 holds the cleat engagement members 41 and 42 are in their cleat release position.

Figure 8:
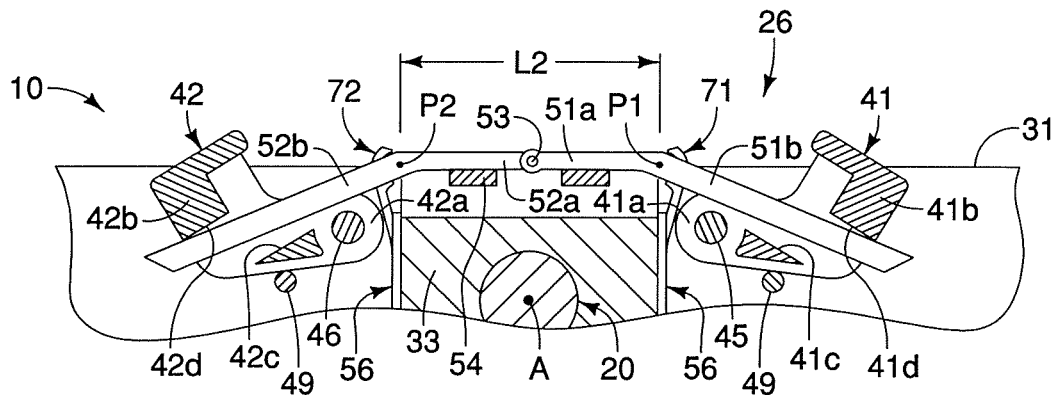
FIG. 8 is an enlarged longitudinal cross sectional view of a portion of the bicycle pedal illustrated in FIGS. 1 to 6, with the control switch moved to an intermediate position and the cleat engagement members of the bicycle pedal in the cleat release positions.
Figure 9:
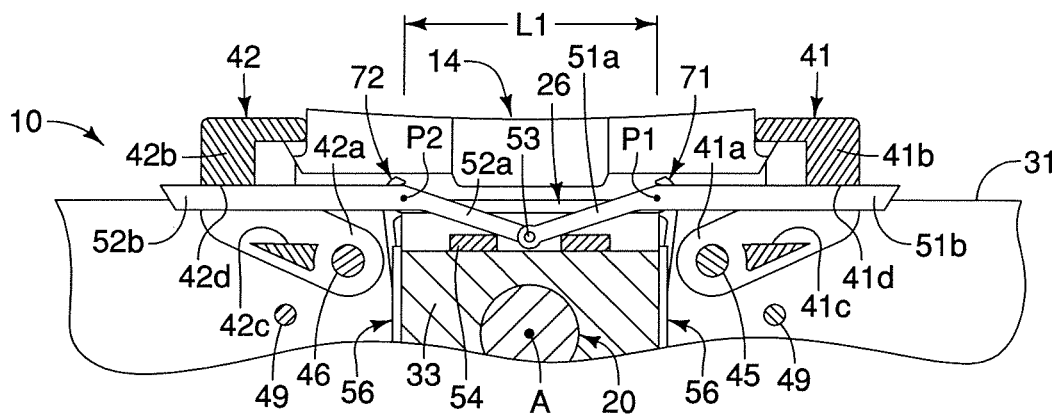
FIG. 9 is an enlarged longitudinal cross sectional view of a portion of the bicycle pedal illustrated in FIGS. 1 to 6, with the control switch moved to a cleat engaged position and the cleat engagement members of the bicycle pedal in the cleat engagement positions.

As seen in FIG. 7, while the first control switch 26 is in the actuation ready position, the first and second bridge members 51a and 52a form an actuating portion that has a minimum effective length L1 between the biasing members 56. Also while the first control switch 26 is in the actuation ready position, the biasing members 56 applies a first urging force on the first and second bridge members 51a and 52a towards each other. Also in the actuation ready position, the contact between the first and second positioning members 51b and 52b and the contact surfaces 41c and 42c of the cleat engagement members 41 and 42 holds the cleat engagement members 41 and 42 are in their cleat release positions. When a rider initially steps on the first and second bridge members 51a and 52a, the first ends of the first and second bridge members 51a and 52a pivot downwardly towards the pedal body 22 on the pivot pin 53. When the first and second bridge members 51a and 52a reach a center or middle position as shown in FIG. 8, the actuating portion of the first and second bridge members 51a and 52a has a maximum effective length L2 between the biasing members 56. In other words, in this center position as shown in FIG. 8, the biasing members 56 are spread apart such that the power of the biasing members 56 reaches a maximum urging force on the first and second bridge members 51a and 52a. At this center position, the first and second positioning members 51b and 52b engage the contact surfaces 41d and 42d of the cleat engagement members 41 and 42, respectively. At this center position, the first and second bridge members 51a and 52a become unstable and the biasing members 56 push the first and second bridge members 51a and 52a together to bow inwardly toward the center plane B of the pedal body 22 as seen in FIG. 9. Thus, the first and second bridge members 51a and 52a will move a stable position. The contact between the first and second positioning members 51b and 52b and the contact surfaces 41d and 42d of the cleat engagement members 41 and 42 holds the cleat engagement members 41 and 42 are in their cleat engagement positions against the cleat 14. In this illustrated embodiment, the effective length L1 of the first and second bridge members 51a and 52a is the same for both the cleat release and engagement positions. However, the effective length L1 of the first and second bridge members 51a and 52a can be different in the cleat release and engagement positions as needed and/or desired.

When the cleat 14 is to be disengaged from the pedal 10, one end of the disengagement member 54 is push down. The middle of the disengagement member 54 is pivotally connected to the pedal body 22. Then the other end of the disengagement member 54 is able to contact to the first and second bridge members 51a and 52a between the biasing members 56. Therefore, when one end of the disengagement member 54 is push down, the first ends of first and second bridge members 51a and 52a are pushed up above the middle position, then the first and second cleat engagement members 41 and 42 are disposed in cleat release positions.

Referring now to FIGS. 7 to 11, basically, the movement of the cleat engagement members 41 and 42 in response to operation of the first control switch 26 will be discussed. The first control switch 26 is operatively connected to the cleat engagement members 41 and 42 of the cleat retaining structure 24 to move the cleat engagement members 41 and 42 from their cleat release positions (FIGS. 7 and 10) to the cleat engagement positions (FIGS. 9 and 11). In particular, when the rider steps on the first control switch 26 with the cleat 14, the first and second bridge members 51a and 52a move towards the pedal body 22. This movement of the first and second bridge members 51a and 52a towards the pedal body 22 causes the effective length of the first and second bridge members 51a and 52a to change from the minimum effective length L1 to the maximum effective length L2. As the first and second bridge members 51a and 52a move from the minimum effective length L1 to the maximum effective length L2, the biasing or pushing forces of the biasing members 56 increases until the first and second bridge members 51a and 52a arrive at the middle position (FIG. 8) of the cleat engagement members 41 and 42 from their cleat release position to the cleat engagement positions. Then, after the first and second bridge members 51a and 52a move past the middle position (FIG. 8) of the cleat engagement members 41 and 42, the effective length of the first and second bridge members 51a and 52a changes from the maximum effective length L2 back to the minimum effective length L1 (FIG. 9). As mentioned above, the effective length L1 does not need to be the same for both the cleat release position and the cleat engagement position.

In this embodiment, the first control switch 26 is operatively coupled to the cleat engagement members 41 and 42 by the first and second positioning members 51b and 52b to selectively retain the cleat engagement members 41 and 42 in their cleat release positions (FIGS. 7 and 10). This retention of the cleat engagement members 41 and 42 in their cleat release positions is accomplished by the first and second positioning members 51b and 52b contacting the contact surfaces 41c and 42c of the cleat engagement members 41 and 42, respectively.

More particularly, in this embodiment, with the cleat engagement members 41 and 42 in their cleat release positions, the biasing members 56 are in a preloaded biasing state such that the first and second bridge members 51a and 52a are being pushed towards each other to pivot together on the pivot pin 53. This preloaded biasing state of the biasing members 56 causes the first and second positioning members 51b and 52b to be biased about the pivot axes P1 and P2 against the contact surfaces 41c and 42c of the cleat engagement members 41 and 42, respectively. The cleat engagement members 41 and 42 are forced into contact with the stop pins 49 such that the cleat engagement members 41 and 42 do not move relative to the pedal body 22 in their cleat release positions. In other words, each of the cleat engagement members 41 and 42 has a single cleat release position due to the biasing forces of the biasing members 56 that holds the cleat engagement members 41 and 42 against the stop pins 49 of the pedal body 22.

Referring to FIGS. 9 and 11, the first control switch 26 is operatively coupled to the cleat engagement members 41 and 42 by the first and second positioning members 51b and 52b to selectively retain the cleat engagement members 41 and 42 in their cleat engagement positions. This retention of the cleat engagement members 41 and 42 in their cleat engagement positions is accomplished by the first and second positioning members 51b and 52b contacting the contact surfaces 41d and 42d of the cleat engagement members 41 and 42, respectively.

More particularly, in this embodiment, with the cleat engagement members 41 and 42 in their cleat engagement positions, the biasing members 56 are in a preloaded biasing state such that the first and second bridge members 51a and 52a are being pushed towards each other to pivot together on the pivot pin 53. This preloaded biasing state of the biasing members 56 causes the first and second positioning members 51b and 52b to be biased about the pivot axes P1 and P2 against the contact surfaces 41d and 42d of the cleat engagement members 41 and 42, respectively. The cleat engagement members 41 and 42 are forced into contact with the cleat 14 such that the cleat engagement members 41 and 42 do not move relative to the pedal body 22 in their cleat engagement positions.

For example, as seen in FIG. 11, a cleat contacting surface 42e of the cleat engagement member 42 is forced into contact with an engagement surface 14a of the cleat 14 to prevent movement of the cleat engagement member 42 relative to the pedal body 22 in its cleat engagement position. The cleat engagement member 41 has a similar cleat contacting surface (not numbered) that contact an engagement surface (not numbered) of the cleat 14 in the same way to prevent movement of the cleat engagement member 41 relative to the pedal body 22 in its cleat engagement position.

In this illustrated example, the cleat contacting surface 42e includes first and second portions that are perpendicularly arranged with respect to each other, and the engagement surface 14a also includes first and second corresponding portions that are perpendicularly arranged with respect to each other. These first and second portions of the cleat contacting surface 42e contact the first and second corresponding portions of the engagement surface 14a to prevent movement of the cleat 14 relative to the pedal body 22. However, depending on the dimensions of the cleat 14, only one of the first and second portions of the cleat contacting surface 42e contacts the corresponding one of the first and second corresponding portions of the engagement surface 14a to prevent movement of the cleat 14 relative to the pedal body 22. Thus, each of the cleat engagement members 41 and 42 has its cleat engagement position determined by the cleat 14 due to the biasing forces of the biasing members 56 that holds the cleat engagement members 41 and 42 against one of the first and second corresponding portions of the engagement surface 14a of the cleat 14.

Figure 20:
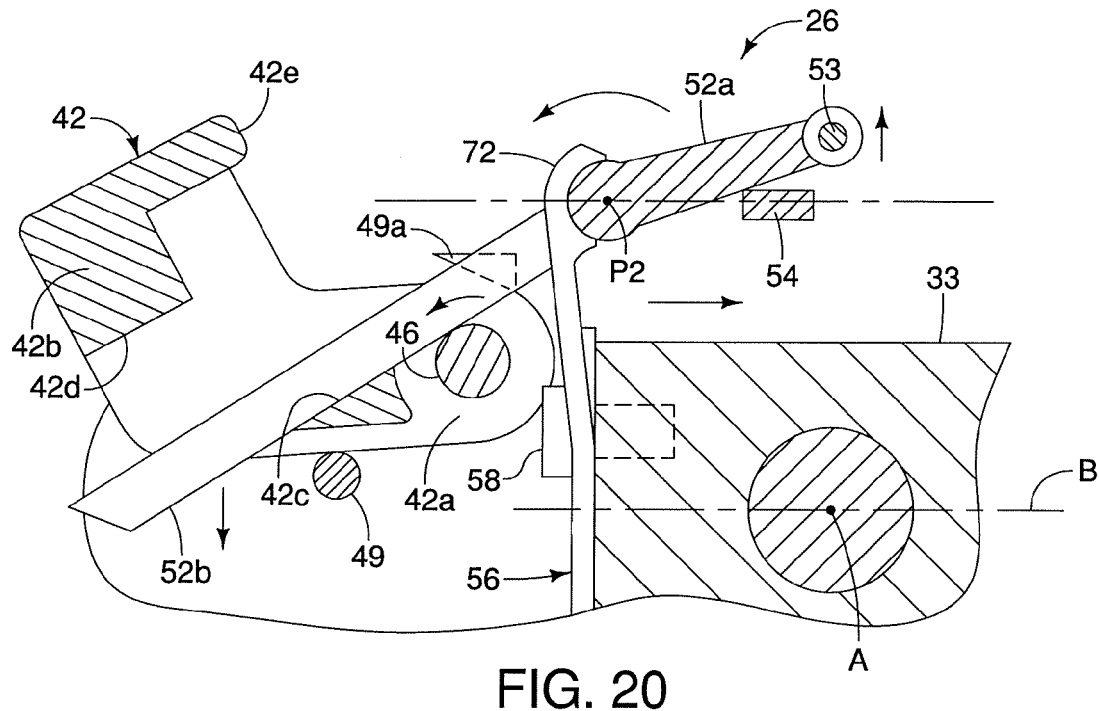
FIG. 20 is an enlarged cross sectional view of a portion of a first modification of the bicycle pedal with the control switch and the cleat engagement member in the cleat release positions.
Figure 21:
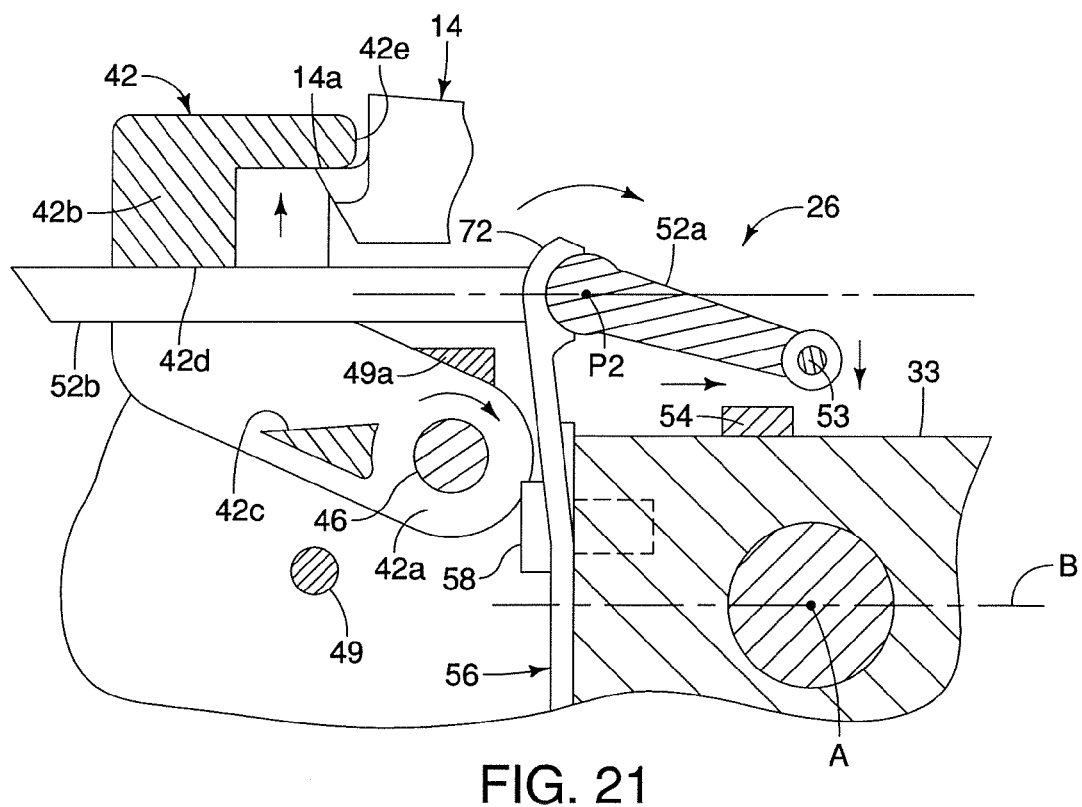
FIG. 21 is an enlarged cross sectional view of a portion of the bicycle pedal illustrated in FIG. 20 with the control switch and the cleat engagement member in the cleat engagement positions.

Referring now to FIGS. 20 and 21, a first modification of the bicycle pedal 10 will now be discussed. Here, the pedal body 22 has been provided with a pair of stop members 49a (only one shown). The stop members 49a has been added to the pedal body 22 for stopping the cleat engagement members 41 and 42 in their cleat engagement positions such that their cleat engagement positions are determined by the pedal body 22 instead of the cleat 14 as in FIGS. 10 and 11. In other words, the cleat engagement members 41 and 42 are pushed against the stop members 49a by the pushing forces of the biasing members 56 that cause the first and second positioning members 51b and 52b to be biased about the pivot axes P1 and P2. As seen in FIG. 20, in this first modification of the bicycle pedal 10, the cleat release positions of the cleat engagement members 41 and 42 is determined by the pedal body 22 in the same manner as discussed above with respect to FIGS. 7 and 10.

Figure 22:
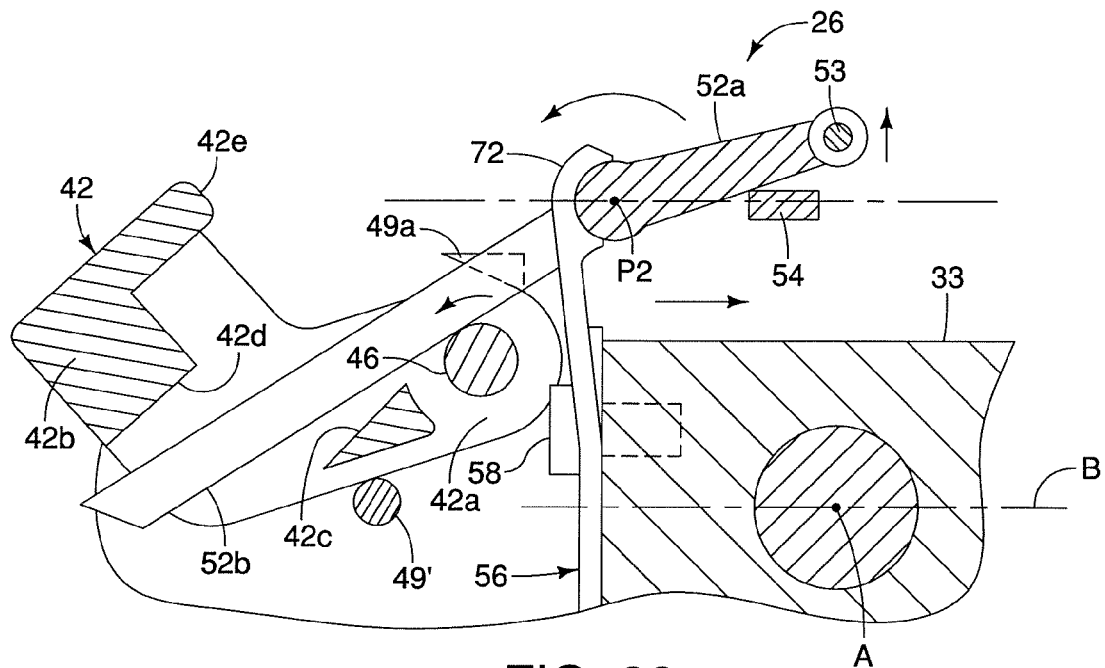
FIG. 22 is an enlarged cross sectional view of a portion of a second modification of the bicycle pedal with the control switch and the cleat engagement member in the cleat release positions.
Figure 23:
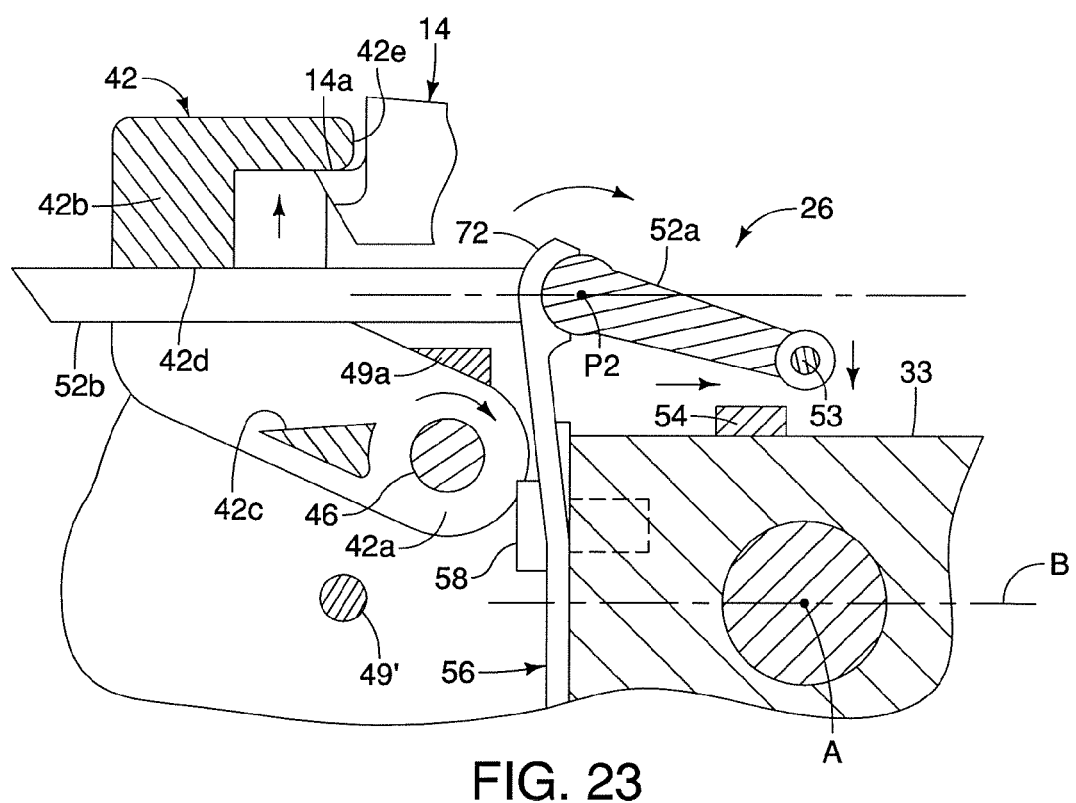
FIG. 23 is an enlarged cross sectional view of a portion of the bicycle pedal illustrated in FIG. 21 with the control switch and the cleat engagement member in the cleat engagement positions.

Referring now to FIGS. 22 and 23, a second modification of the bicycle pedal 10 will now be discussed. Here, the pedal body 22 has been provided with the stop members 49a (only one shown) of the first modification of the bicycle pedal 10 shown in FIGS. 20 and 21 and a pair stop pins 49' (only one shown). The stop pins 49' are located such that the cleat engagement members 41 and 42 can float in the cleat release positions. In other words, the cleat engagement members 41 and 42 can move relative to the pedal body 22 between the first and second positioning members 51b and 52b and the pedal body 22 in the cleat release positions because no biasing force is applied to the cleat engagement members 41 and 42 by the biasing members 56 in the cleat release positions. As seen in FIG. 23, in this first modification of the bicycle pedal 10, stop members 49a has been added to the pedal body 22 for stopping the cleat engagement members 41 and 42 in their cleat engagement positions such that their cleat engagement positions are determined by the pedal body 22 instead of the cleat 14 as in FIGS. 10 and 11.

Figure 24:
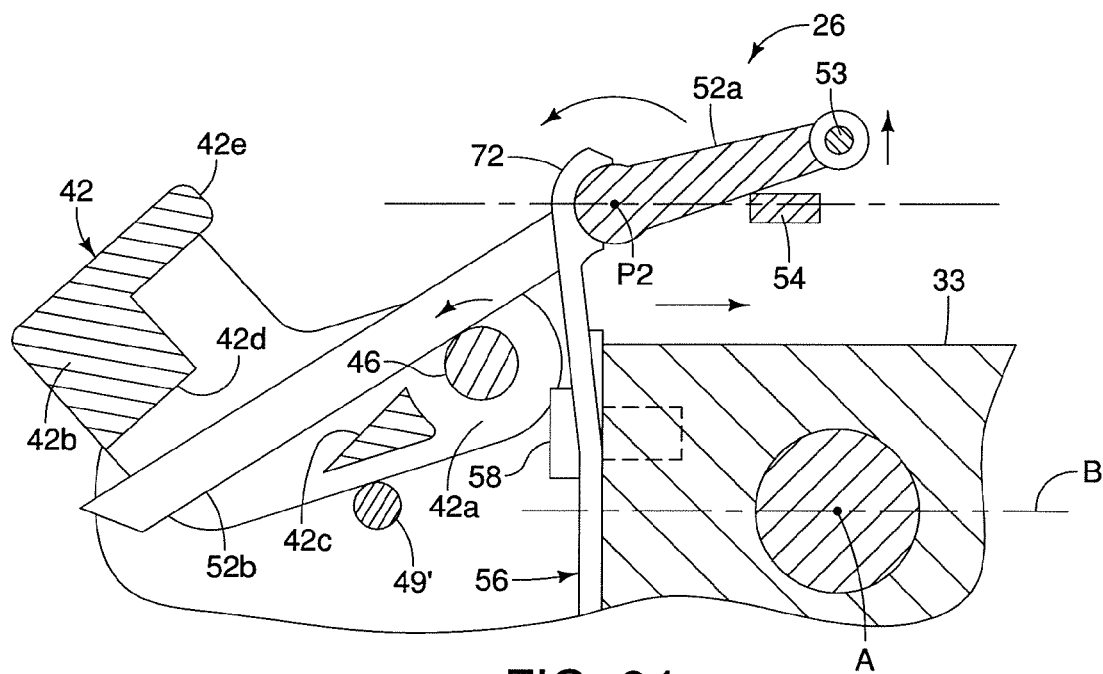
FIG. 24 is an enlarged cross sectional view of a portion of a third modification of the bicycle pedal with the control switch and the cleat engagement member in the cleat release positions.
Figure 25:
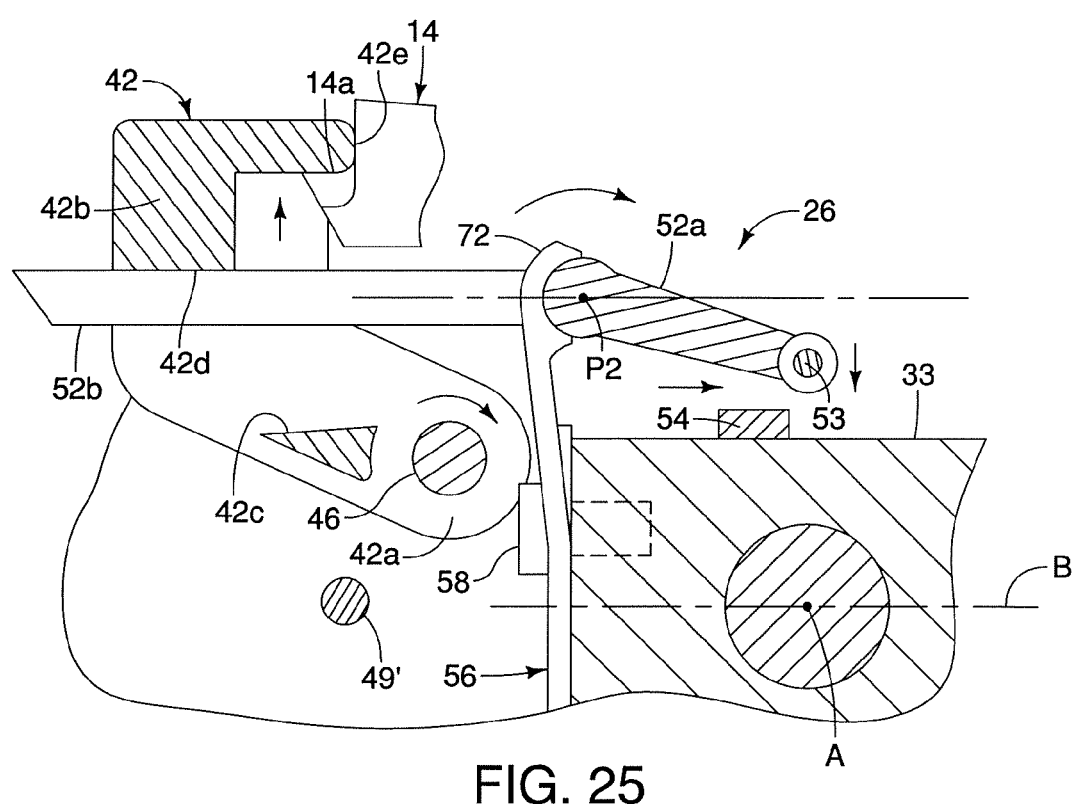
FIG. 25 is an enlarged cross sectional view of a portion of the bicycle pedal illustrated in FIG. 24 with the control switch and the cleat engagement member in the cleat engagement positions.

Referring now to FIGS. 24 and 25, a third modification of the bicycle pedal 10 will now be discussed. Here, the pedal body 22 has been provided the stop pins 49' (only one shown) of the second modification of the bicycle pedal 10 shown in FIGS. 22 and 23. The stop pins 49' are located such that the cleat engagement members 41 and 42 can float in the cleat release positions as in the second modification of the bicycle pedal 10 shown in FIGS. 22 and 23. Since the third modification of the bicycle pedal 10 does not include the stop members 49a, each of the cleat engagement members 41 and 42 has its cleat engagement position determined by the cleat 14 due to the biasing forces of the biasing members 56 that holds the cleat engagement members 41 and 42 against one of the first and second corresponding portions of the engagement surface 14a of the cleat 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular refers to a single integrated part that moves as a unit and does not include a plurality of parts with independent and separate movement between. In other words, as used herein, the terms "member" or "element" can be made of several pieces to form an integral unit, but does not include two or more parts with a first part that moves relative to a second part. As used herein to describe the present invention, the following directional terms "forward, rearward, above, downward, vertical, horizontal, below and transverse" as well as any other similar directional terms refer to those directions of a bicycle equipped with the bicycle pedal on a flat horizontal surface. Accordingly, these terms, as utilized to describe the present invention should be interpreted relative to a bicycle equipped with the bicycle pedal as used in the normal riding position on a flat horizontal surface. Finally, terms of degree such as "substantially", "about" and "approximately"

as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, in the illustrated embodiment, the cleat 14 can be selectively retained to either the first shoe supporting side 36 or the second shoe supporting side 38 of the pedal body 22. However, the cleat engagement members 43 and 44 can be eliminated if needed and/or desired so that the cleat 14 can be selectively retained to only the first shoe supporting side 36 of the pedal body 22. Also in the illustrated embodiment, the cleat retaining structure 24 uses two movable cleat engagement members for engaging the cleat 14. However, the cleat retaining structure 24 can be configured such that one of the cleat engagement members is a movable cleat engagement member, as discussed above, and the other cleat engagement member is non-movable cleat engagement member if needed and/or desired. Moreover, components that are shown directly connected or contacting each other can have intermediate structures disposed between them, unless otherwise indicated. The functions of one element can be performed by two, and vice versa. Thus, the foregoing descriptions of the embodiments of a bicycle pedal are provided for illustration only, and not for the purpose of limiting the invention as defined by the appended claims and their equivalents.

What is claimed is:

1. A bicycle pedal comprising:
   a pedal spindle;
   a pedal body rotatably mounted on the pedal spindle;
   a first cleat engagement member movably mounted relative to the pedal body between a release position and an engagement position; and
   a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat, the first positioning member initially moving relative to the first cleat engagement member such that relative movement exists between the first positioning member and the first cleat engagement member as the first positioning member moves between the first and second positions;
   a second cleat engagement member disposed on the same side of the pedal spindle as the first cleat engagement member; and
   control switch movably disposed between the first cleat engagement member and the second cleat engagement member on the same side of the pedal spindle, and coupled relative to the pedal body to switch a direction of push applied to the first positioning member with respect to the first cleat engagement member from a first pushing direction to a second pushing direction that is different from the first pushing direction,
   the first positioning member directly contacting the first cleat engagement member in both the release position and the engagement position of the first cleat engagement member.

2. The bicycle pedal according to claim 1, wherein the control switch is disposed between the first and second cleat engagement members in a direction perpendicular to a rotational axis of the pedal body.

3. The bicycle pedal according to claim 1, wherein the first positioning member is configured with respect to the first cleat engagement member such that the first positioning member prevents movement of the first cleat engagement member from the engagement position to the release position while the first positioning member is in the second position.

4. The bicycle pedal according to claim 1, wherein the first positioning member is configured with respect to the first cleat engagement member such that the first positioning member prevents movement of the first cleat engagement member from the release position to the engagement position while the first positioning member is in the first position.

5. The bicycle pedal according to claim 1, further comprising
   the second cleat engagement member movably mounted relative to the pedal body between a release position and an engagement position; and
   a second positioning member movably coupled relative to the pedal body between first position and a second position, the second positioning member moving the second cleat engagement member to the release position of the second cleat engagement member while the second positioning member is moving from the second position of the second positioning member to the first position of the second positioning member in response to engagement of the pedal by the cleat, and the second positioning member moving the second cleat engagement member to the engagement position of the second cleat engagement member while the second positioning member is moving from the first position of the second positioning member to the second position of the second positioning member in response to engagement of the pedal by the cleat.

6. The bicycle pedal according to claim 5, wherein the control switch is disposed between the first and second cleat engagement members in a direction perpendicular to a rotational axis of the pedal body.

7. The bicycle pedal according to claim 6, wherein the control switch includes a first bridge member and a second bridge member with the first and second bridge members having first ends movably connected together and second ends coupled to the first and second positioning members, respectively.

8. The bicycle pedal according to claim 7, wherein the control switch includes a biasing member contacting the first and second bridge members such that the biasing member is configured to selectively hold the first and second bridge members in a convex arrangement to bulge outwardly with respect to the pedal body and a concave arrangement to protrude inwardly with respect to the pedal body.

9. The bicycle pedal according to claim 7, wherein the control switch includes a biasing member contacting the first and second bridge members such that the biasing member biases the first and second bridge members inwardly towards each other as the first and second positioning members move.

10. The bicycle pedal according to claim 9, wherein the biasing member has a first stop with a first curved engagement surface that pivotally supports one of the second ends of the first and second bridge members.

11. The bicycle pedal according to claim 6, wherein
the control switch includes a disengagement member that moves the first and second positioning members from the second positions to the first positions.

12. The bicycle pedal according to claim 6, wherein
the control switch includes a disengagement lever that moves the first ends of the first and second bridge members away from the pedal body.

13. The bicycle pedal according to claim 1, wherein
the first cleat engagement member has first and second contact surfaces which face each other, the first positioning member selectively engaging the first contact surface to move the first cleat engagement member from the engagement position to the release position, and the first positioning member selectively engaging the second contact surface to move the first cleat engagement member from the release position to the engagement position.

14. A bicycle pedal comprising:
a pedal spindle;
a pedal body rotatably mounted on the pedal spindle;
a first cleat engagement member movably mounted relative to the pedal body between a release position and an engagement position; and
a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat;
a second cleat engagement member disposed on the same side of the pedal spindle as the first cleat engagement member; and
a control switch movably disposed between the first cleat engagement member and the second cleat engagement member on the same side of the pedal spindle, and coupled relative to the pedal body to switch a direction of push applied to the first positioning member with respect to the first cleat engagement member from a first pushing direction to a second pushing direction that is different from the first pushing direction,
the first positioning member being configured with respect to the first cleat engagement member such that a pushing force applied to the first cleat engagement member towards the engagement position increases until the first cleat engagement member arrives at a middle position between the engagement position and the release position from the engagement position.

15. A bicycle pedal comprising:
a pedal spindle;
a pedal body rotatably mounted on the pedal spindle;
a first cleat engagement member movably mounted relative to the pedal body between a release position and an engagement position;
a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat;
a second cleat engagement member disposed on the same side of the spindle body as the first cleat engagement member; and
a control switch movably disposed between the first cleat engagement member and the second cleat engagement member on the same side of the pedal spindle, and coupled relative to the pedal body to switch a direction of push applied to the first positioning member with respect to the first cleat engagement member from a first pushing direction to a second pushing direction that is different from the first pushing direction,
the first positioning member being configured with respect to the first cleat engagement member such that a pushing force applied to the first cleat engagement member towards the release position increases until the first cleat engagement member arrives at a middle position between the engagement position and the release position from the release position.

16. A bicycle pedal comprising:
a pedal spindle;
a pedal body rotatably mounted on the pedal spindle;
a first cleat engagement member movably mounted relative to the pedal body between a release position and an engagement position;
a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat;
a second cleat engagement member movably mounted relative to the pedal body between a release position and an engagement position;
a second positioning member movably coupled relative to the pedal body between a first position and a second position, the second positioning member moving the second cleat engagement member to the release position of the second cleat engagement member while the second positioning member is moving from the second position of the second positioning member to the first position of the second positioning member in response to engagement of the pedal by the cleat, and the second positioning member moving the second cleat engagement member to the engagement position of the second cleat engagement member while the second positioning member is moving from the first position of the second positioning member to the second position of the second positioning member in response to engagement of the pedal by the cleat;
a control switch movably coupled relative to the pedal body to switch a direction of push applied to the first positioning member with respect to the first cleat engagement member from a first pushing direction to a second pushing direction that is different from the first pushing direction, and to switch a direction of push applied to the second positioning member with respect to the second cleat engagement member from a first pushing direction to a second pushing direction that is different from the first pushing direction, the control switch being arranged to move between a convex arrangement in which the control switch bulges outwardly with respect to the pedal body and a concave arrangement in which the control switch protrudes inwardly with respect to the pedal body in response to engagement of the pedal by the cleat.

17. A bicycle pedal comprising:
a pedal spindle;
a pedal body rotatably mounted on the pedal spindle;
a first cleat engagement member movably mounted relative to the pedal body between a release position and an engagement position; and
a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat, the first positioning member initially moving relative to the first cleat engagement member such that relative movement exists between the first positioning member and the first cleat engagement member as the first positioning member moves between the first and second positions,
the first positioning member directly contacting the first cleat engagement member in both the release position and the engagement position of the first cleat engagement member;
a second cleat engagement member movably mounted relative to the pedal body between a release position and an engagement position;
a second positioning member movably coupled relative to the pedal body between a first position and a second position, the second positioning member moving the second cleat engagement member to the release position of the second cleat engagement member while the second positioning member is moving from the second position of the second positioning member to the first position of the second positioning member in response to engagement of the pedal by the cleat, and the second positioning member moving the second cleat engagement member to the engagement position of the second cleat engagement member while the second positioning member is moving from the first position of the second positioning member to the second position of the second positioning member in response to engagement of the pedal by the cleat; and
a control switch movably coupled relative to the pedal body to switch a direction of push applied to the first positioning member with respect to the first cleat engagement member from a first pushing direction to a second pushing direction that is different from the first pushing direction, and to switch a direction of push applied to the second positioning member with respect to the second cleat engagement member from a first pushing direction to a second pushing direction that is different from the first pushing direction;
the control switch including a first bridge member and a second bridge member with the first and second bridge members having first ends movably connected together and second ends coupled to the first and second positioning members, respectively;

the control switch including a biasing member contacting the first and second bridge members such that the biasing member is configured to selectively hold the first and second bridge members in a convex arrangement to bulge outwardly with respect to the pedal body and a concave arrangement to protrude inwardly with respect to the pedal body.

18. A bicycle pedal comprising:
a pedal spindle;
a pedal body rotatably mounted on the pedal spindle;
a first cleat engagement member movably mounted relative to the pedal body between a release position and an engagement position; and
a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat, the first positioning member initially moving relative to the first cleat engagement member such that relative movement exists between the first positioning member and the first cleat engagement member as the first positioning member moves between the first and second positions,
the first positioning member directly contacting the first cleat engagement member in both the release position and the engagement position of the first cleat engagement member;
a second cleat engagement member movably mounted relative to the pedal body between a release position and an engagement position;
a second positioning member movably coupled relative to the pedal body between a first position and a second position, the second positioning member moving the second cleat engagement member to the release position of the second cleat engagement member while the second positioning member is moving from the second position of the second positioning member to the first position of the second positioning member in response to engagement of the pedal by the cleat, and the second positioning member moving the second cleat engagement member to the engagement position of the second cleat engagement member while the second positioning member is moving from the first position of the second positioning member to the second position of the second positioning member in response to engagement of the pedal by the cleat; and
a control switch movably coupled relative to the pedal body to switch a direction of push applied to the first positioning member with respect to the first cleat engagement member from a first pushing direction to a second pushing direction that is different from the first pushing direction, and to switch a direction of push applied to the second positioning member with respect to the second cleat engagement member from a first pushing direction to a second pushing direction that is different from the first pushing direction;
the control switch including a disengagement lever that moves the first ends of the first and second bridge members away from the pedal body.

19. A bicycle pedal comprising:
a pedal spindle;

a pedal body rotatably mounted on the pedal spindle;

a first cleat engagement member movably mounted relative to the pedal body between a release position and an engagement position; and a first positioning member movably coupled relative to the pedal body between a first position and a second position, the first positioning member moving the first cleat engagement member to the release position while the first positioning member is moving from the second position to the first position, and the first positioning member moving the first cleat engagement member to the engagement position while the first positioning member is moving from the first position to the second position in response to engagement of the pedal by the cleat, the first positioning member initially moving relative to the first cleat engagement member such that relative movement exists between the first positioning member and the first cleat engagement member as the first positioning member moves between the first and second positions, the first positioning member directly contacting the first cleat engagement member in both the release position and the engagement position of the first cleat engagement member, the first cleat engagement member having first and second contact surfaces which face each other, the first positioning member selectively engaging the first contact surface to move the first cleat engagement member from the engagement position to the release position, and the first positioning member selectively engaging the second contact surface to move the first cleat engagement member from the release position to the engagement position.

* * * * *